Patented Jan. 27, 1925.

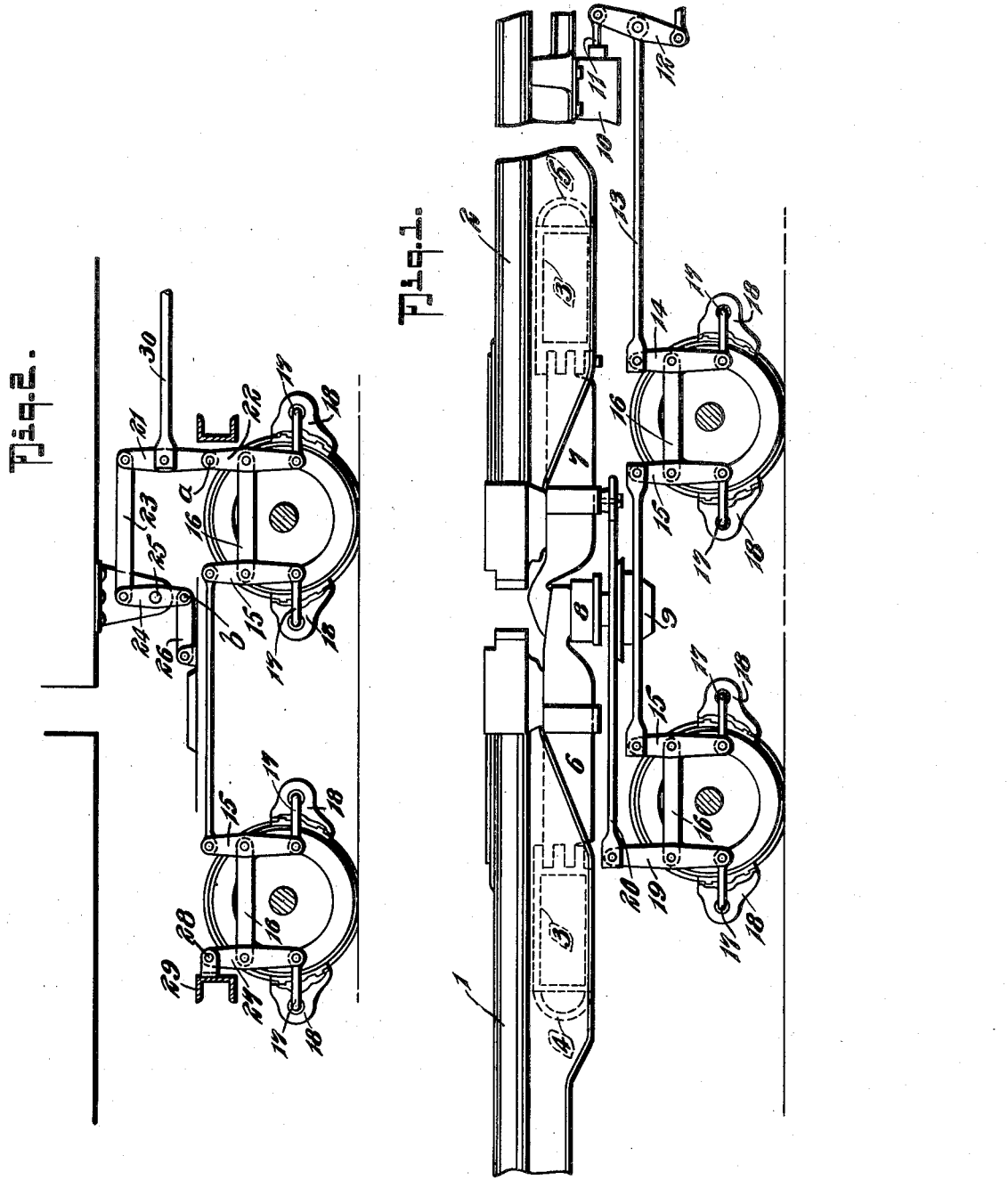

1,524,207

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

BRAKE RIGGING.

Original application filed December 28, 1922, Serial No. 609,521. Divided and this application filed April 17, 1923. Serial No. 632,722.

*To all whom it may concern:*

Be it known that I, HARRY M. PFLAGER, a citizen of the United States, residing at St. Louis, Missouri, have invented a certain new and useful Improvement in Brake Rigging, of which the following is a full, clear, and exact description, such as will enable others skilled in the art to which it appertains to make and use the same, reference being had to the accompanying drawings, forming part of this application.

My invention relates to railroad rolling stock and consists in an improved brake rigging arrangement which is especially adapted for use on cars in which the truck has movement relative to the car body on which the brake operating mechanism is mounted. Such a car construction is illustrated in my copending Patent No. 1,459,250, issued June 19, 1923 which discloses an articulated car construction in which two car bodies have their adjacent ends mounted upon a single truck.

Figure 1 of the accompanying drawings indicates such an articulated car construction, being a side elevation of the adjacent ends of two car bodies mounted upon a single truck and illustrating a preferred arrangement of a brake rigging.

Figure 2 is a similar elevation but indicating a modified arrangement of brake rigging.

In Figure 1 the two car body platforms are indicated at 1 and 2, respectively, and each body mounts a draft rigging 3 including draft yokes 4 and 5, the outer ends of which are connected to drawbars 6 and 7 which terminate in interengaging portions forming a body center plate 8 adapted to engage and be supported by a truck center plate 9. The adjacent ends of the car bodies illustrated are pivoted to each other and supported by the truck through these drawbars 6 and 7. It will be understood that the draft rigging of each car provides for limited movement of the respective draw-bar longitudinally of the car body as is provided in the usual car construction to assist in absorbing buffing and pulling stresses.

This assembly of the car bodies and the truck creates a problem in the application of brake rigging consisting of the usual rigid elements which problem may be solved by the arrangements shown in Figures 1 and 2.

In Figure 1 the brake rigging is operated from the righthand car 2 which mounts an ordinary cylinder 10, the piston 11 of which is connected to a cylinder lever 12 from which a connecting rod 13 extends to the truck live lever 14 in the ordinary manner. The truck brake rigging includes the usual floating lever 15, connections 16, brake beams 17, brake heads 18 etc., and also includes a truck dead lever 19 which is anchored to the drawbar carry iron 31 by means of a connecting rod 20.

With this anchoring of the dead lever, movement of truck and of the brake rigging mounted on the truck longitudinally of the right hand car (to the extent permitted by the draftgear) will not produce any operative movement of the brake rigging as truck levers 14, 15 and 19 will swing about their upper ends like the connecting elements of a parallel ruler and their lower ends will remain the same distance apart thereby maintaining the brakes in released position. When piston 11 is thrust outwardly, the pull on rod 13 will be transmitted to the brake beams in the usual manner and the brakes will be set as the truck dead lever 19 is anchored against any movement resulting from the travel of the cylinder piston.

There may be occasions when it will be desirable to anchor the dead lever to the truck frame or to eliminate its anchoring to the carry iron and the arrangement of the brake rigging shown in Figure 2 provides for such occasion by the provision of a compensating means comprising a cylinder connection rod floating lever 21 having one end secured to the truck live lever 22 and having its opposite end connected by a rod 23 to a compensating lever 24 fulcrumed between its ends on the car body at 25 and having its opposite end secured to the truck bolster or frame by a connection 26. The remaining truck brake rigging elements correspond to those shown in Figure 1 but it will be noticed that the truck dead lever 27 is anchored at 28 to a portion of a truck frame 29. It will be understood that the car bodies shown in Figure 2 are supported by the single truck through interengaging drawbars (not shown) as detailed in Figure 1.

In this construction the additional elements 21, 23, 24 and 26 secure the same compensating result as the anchorage of the dead lever shown in Figure 1. For instance, movement of the truck to the left relative to the car body will shift points a and b to the left whereupon levers 21 and 24 will turn about their centers as pivots without affecting the position of the cylinder lever connecting rod 30.

Various other arrangements of the brake rigging adapted to compensate for movement of the truck lengthwise of the body will suggest themselves to those familiar with brake installations and I contemplate such variations as fall within the scope of my invention as expressed in the appended claims.

I claim:

1. In a railway car, a body, and a truck supporting one end of said body and having movement longitudinally thereof, and a brake rigging for the wheels of said truck operated from said body.

2. In a railway car, a body, a truck supporting one end of said body and having movement longitudinally thereof, a brake rigging for the wheels of said truck, and means for compensating for relative movement between said truck and body so that said brake rigging is not affected by such movement.

3. In a railway car, a body, a truck movable longitudinally of the car body, brake rigging for the wheels of said truck including a cylinder mounted on said body, a truck live lever connected to said cylinder, and a truck dead lever.

4. In a railway car, a body, a truck movable longitudinally of the car body, brake rigging for the wheels of said truck mounted on said truck and body and provided with means to compensate for relative movement of said truck and body.

5. In a railway car, a body, a truck movable longitudinally of the car body, brake rigging for the wheels of said truck, including the usual cylinder lever connecting rod and truck dead and live levers a compensating lever fulcrumed between its ends on said body, a floating lever fulcrumed between its ends on the cylinder lever connecting rod, a connection between one end of said compensating lever and said truck, a connection between the other end of said compensating lever and one end of said floating lever, and a connection between the other end of said floating lever and the brake live lever.

6. In articulated car construction, two car bodies pivotally connected at their adjacent ends, a single truck supporting both of said car ends, and brake rigging mounted on said truck and on one of said car bodies and mechanism on one of said bodies for operating said rigging.

7. In articulated car construction, two car bodies pivotally connected at their adjacent ends, a single truck supporting both of said car ends and movable to a limited extent longitudinally of both cars, and brake rigging comprising an operating cylinder, rods, and levers mounted on one of said cars, brake beams, brake levers and connections mounted on said truck, said rigging including means compensating for relative movement of said truck and bodies so that such movement will not set the brakes.

8. In a railway car, a body, a truck movable longitudinally of the car body, brake rigging for the wheels of said truck including the usual cylinder lever connecting rod and truck dead and live levers, a compensating lever fulcrumed on said body, a floating lever fulcrumed on the cylinder lever connecting rod, a connection between said compensating lever and said truck, a connection between said compensating lever and said floating lever, and a connection between said floating lever and the brake live lever.

9. In articulated car construction, two car bodies pivotally connected at their adjacent ends, a single truck supporting both of said car ends, brake rigging mounted on said truck, and mechanism on one of said bodies for operating said rigging.

10. In combination, a wheeled truck, brakes for said wheels mounted on said truck, a correlated structure bodily movable relatively to said truck, brake operating mechanism mounted on said structure, and rigid elements connecting said mechanism and brakes and arranged to accommodate movement between said truck and structure without affecting said brakes.

In testimony whereof I hereunto affix my signature this 12 day of April, 1923.

H. M. PFLAGER.